US012734763B2

(12) United States Patent
van Tooren et al.

(10) Patent No.: US 12,734,763 B2
(45) Date of Patent: Sep. 15, 2026

(54) ULTRASONIC WELDING THERMOPLASTIC MATERIAL USING ENERGY TRANSMISSION MATERIAL

(71) Applicant: Rohr, Inc., Chula Vista, CA (US)

(72) Inventors: Michael van Tooren, San Diego, CA (US); Shyan Bob Shen, San Diego, CA (US); Jeffrey D. Woods, Beaumont, CA (US); Keith E. Ritchie, San Diego, CA (US)

(73) Assignee: Rohr, Inc., Chula Vista, CA (US)

(*) Notice: Subject to any disclaimer, the term of this patent is extended or adjusted under 35 U.S.C. 154(b) by 262 days.

(21) Appl. No.: 18/235,385

(22) Filed: Aug. 18, 2023

(65) Prior Publication Data

US 2024/0391179 A1 Nov. 28, 2024

Related U.S. Application Data

(60) Provisional application No. 63/468,172, filed on May 22, 2023.

(51) Int. Cl.

*B29C 65/08* (2006.01)
*B29C 65/00* (2006.01)

(52) U.S. Cl.

CPC ............ *B29C 65/08* (2013.01); *B29C 66/721* (2013.01)

(58) Field of Classification Search

CPC . B29C 65/08; B29C 66/0044; B29C 66/1122; B29C 66/41; B29C 66/472;

(Continued)

(56) References Cited

U.S. PATENT DOCUMENTS 4,950,347 A * 8/1990 Futagawa ............... B29C 65/04 156/308.2
5,882,756 A 3/1999 Alston (Continued)

FOREIGN PATENT DOCUMENTS

| | | | |
|---|---|---|---|
| EP | 4122686 A1 | 1/2023 | |
| JP | H08336897 A | 12/1996 | |
| JP | 2010143156 A * | 7/2010 | ........... B29C 66/232 |

OTHER PUBLICATIONS

Ibrahim El-Hedok, "Amorphous vs. Crystalline Polymers," Jul. 8, 2023, Paint & Coatings Industry. https://www.pcimag.com/articles/111547-amorphous-vs-crystalline-polymers (Year: 2023).*

(Continued)

*Primary Examiner* — Philip C Tucker
(74) *Attorney, Agent, or Firm* — Getz Balich LLC

(57) ABSTRACT

A method is provided during which a first thermoplastic composite body is arranged on a rigid support structure. The first thermoplastic composite body contacts the rigid support structure. A second thermoplastic composite body is arranged on the first thermoplastic composite body. The second thermoplastic composite body contacts the first thermoplastic composite body. Energy transmission material is arranged on the second thermoplastic composite body. The first thermoplastic composite body and the second thermoplastic composite body are disposed between the rigid support structure and the energy transmission material. The second thermoplastic composite body is ultrasonic welded to the first thermoplastic composite body using an ultrasonic horn. The energy transmission material is arranged between the second thermoplastic composite body and the ultrasonic horn.

18 Claims, 8 Drawing Sheets

(58) Field of Classification Search
CPC ....... B29C 66/50; B29C 66/71; B29C 66/721; B29C 66/7212; B29C 66/73771; B29C 66/73773; B29C 66/73921; B29C 66/8122; B29C 66/81457; B29C 66/8322; B29C 73/10; B29C 73/12; B29C 73/30; B29K 2105/0079; B29L 2031/3076; B29L 2031/3082; B29L 2031/3085
USPC .... 156/60, 73.1, 94, 98, 293, 297, 298, 299, 156/300, 303.1, 308.2, 309.6
See application file for complete search history.

(56) References Cited

U.S. PATENT DOCUMENTS 7,896,994 B2 * 3/2011 Soccard .............. B29C 66/9161
156/244.11
9,845,142 B2 12/2017 Gleason
10,427,241 B2 10/2019 Shah
10,710,352 B2 7/2020 Bertrand
11,104,086 B2 8/2021 Wee
12,194,690 B2 * 1/2025 Wadsworth ............. B29C 65/72
2007/0102094 A1 * 5/2007 de Groot ................... F16B 5/01
264/445
2016/0221255 A1 * 8/2016 Wang ...................... B29C 66/21
2020/0338835 A1 10/2020 Wang
2023/0059804 A1 * 2/2023 Short ...................... B29C 66/92
2023/0059894 A1 2/2023 Myrdek
2025/0222666 A1 * 7/2025 Shen ....................... B29C 73/30

OTHER PUBLICATIONS

EP Search Report for EP Patent Application No. 24177304.3 dated Oct. 7, 2024.

* cited by examiner

ULTRASONIC WELDING THERMOPLASTIC MATERIAL USING ENERGY TRANSMISSION MATERIAL

CROSS-REFERENCE TO RELATED APPLICATIONS

This application claims priority to U.S. Provisional Patent Application No. 63/468,172 filed May 22, 2023, which is hereby incorporated herein by reference in its entirety.

BACKGROUND

1. Technical Field

This disclosure relates generally to welding and, more particularly, to ultrasonic welding thermoplastic material.

2. Background Information

Various systems and methods are known in the art for ultrasonic welding thermoplastic material. While these known ultrasonic welding systems and methods have various benefits, there is still room in the art for improvement.

SUMMARY OF THE DISCLOSURE

According to an aspect of the present disclosure, a method is provided during which a first thermoplastic composite body is arranged on a rigid support structure. The first thermoplastic composite body contacts the rigid support structure. A second thermoplastic composite body is arranged on the first thermoplastic composite body. The second thermoplastic composite body contacts the first thermoplastic composite body. Energy transmission material is arranged on the second thermoplastic composite body. The first thermoplastic composite body and the second thermoplastic composite body are disposed between the rigid support structure and the energy transmission material. The second thermoplastic composite body is ultrasonic welded to the first thermoplastic composite body using an ultrasonic horn. The energy transmission material is arranged between the second thermoplastic composite body and the ultrasonic horn.

According to another aspect of the present disclosure, another method is provided during which a first thermoplastic composite body is provided. A second thermoplastic composite body is arranged on the first thermoplastic composite body. Energy transmission material is arranged on the second thermoplastic composite body. The second thermoplastic composite body is disposed between and contacts the first thermoplastic composite body and the energy transmission material. The second thermoplastic composite body is ultrasonic welded to the first thermoplastic composite body using an ultrasonic horn. The energy transmission material is arranged between the second thermoplastic composite body and the ultrasonic horn. The energy transmission material is lifted off of the second thermoplastic composite body following the ultrasonic welding. The aircraft component includes the first thermoplastic composite body and the second thermoplastic composite body welded to the first thermoplastic composite body.

According to still another aspect of the present disclosure, a repair method is provided during which an aircraft component is provided. The aircraft component is configured as or otherwise includes a first thermoplastic composite body. A second thermoplastic composite body is arranged on the first thermoplastic composite body. Energy transmission material is arranged on the second thermoplastic composite body. The second thermoplastic composite body is disposed between and contacts the first thermoplastic composite body and the energy transmission material. The second thermoplastic composite body is ultrasonic welded to the first thermoplastic composite body using an ultrasonic horn to at least partially repair a damaged portion of the first thermoplastic composite body. The energy transmission material is arranged between the second thermoplastic composite body and the ultrasonic horn.

The method may also include removing the damaged portion from the first thermoplastic composite body to form an aperture in the first thermoplastic composite body. The arranging of the second thermoplastic composite body may include disposing the second thermoplastic composite body within the aperture and onto an interior surface of the first thermoplastic composite body.

The energy transmission material may be configured as or otherwise include one or more flexible layers of material.

The energy transmission material may be configured as or otherwise include one or more layers of elastomeric material.

The elastomeric material may be or otherwise include polytetrafluoroethylene, fluoroelastomer, silicone rubber, chlorosulphonated polyethene rubber, ethylene-propylene-diene monomer, hydrogenated acrylonitrile-butadiene rubber and/or polyurethane.

The energy transmission material may be configured as or otherwise include one or more layers of metal.

The method may also include lifting the energy transmission material off of the second thermoplastic composite body following the ultrasonic welding.

The energy transmission material may not be welded to the second thermoplastic composite body during the ultrasonic welding.

The energy transmission material may contact the second thermoplastic composite body.

The energy transmission material may also contact the first thermoplastic composite body.

The second thermoplastic composite body may contact an exterior surface of the first thermoplastic composite body.

An aperture may extend into the first thermoplastic composite body from an exterior surface of the first thermoplastic composite body to an interior surface of the first thermoplastic composite body. The second thermoplastic composite body may contact the interior surface.

The method may also include: removing the energy transmission material from the second thermoplastic composite body following the ultrasonic welding of the second thermoplastic composite body to the first thermoplastic composite body; arranging a third thermoplastic composite body on the second thermoplastic composite body and within the aperture; arranging the energy transmission material or additional energy transmission material on the third thermoplastic composite body; and ultrasonic welding the third thermoplastic composite body to the second thermoplastic composite body using the ultrasonic horn.

The method may also include removing a damaged portion of the first thermoplastic composite body to form the aperture in the first thermoplastic composite body.

The rigid support structure may be configured as or otherwise include a metal anvil.

The ultrasonic horn may extend along a vertical axis to a tip engaged with the energy transmission material. The ultrasonic horn may move vertically up and down along the vertical axis during the ultrasonic welding.

The method may also include providing an aircraft component. The aircraft component may include the first thermoplastic composite body and the second thermoplastic composite body welded to the first thermoplastic composite body.

A surface of the first thermoplastic composite body which contacts the rigid support structure during the ultrasonic welding may at least partially (or completely) form an exterior aerodynamic flow surface of the aircraft component.

The first thermoplastic composite body may be configured from or otherwise include a semi-crystalline thermoplastic resin or an amorphous thermoplastic resin. The second thermoplastic composite body may also or alternatively be configured from or otherwise include a semi-crystalline thermoplastic resin or an amorphous thermoplastic resin.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
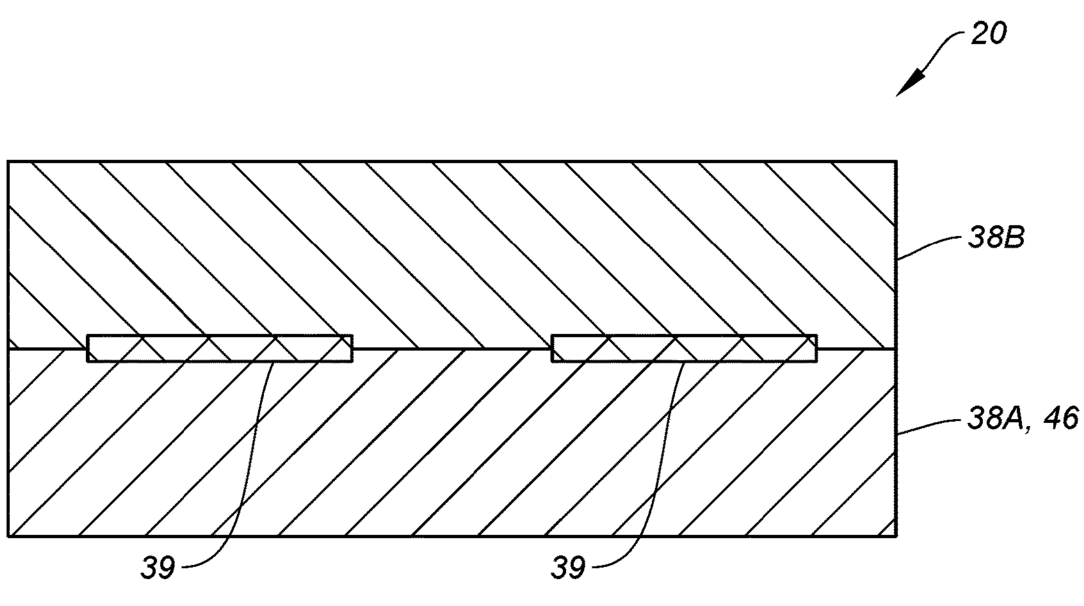
FIG. 1 is a partial schematic sectional illustration of a thermoplastic composite component.

The present disclosure includes methods and systems for manufacturing a component 20 (e.g., a thermoplastic composite component), an exemplary embodiment of which is shown in FIG. 1. The term "manufacturing" may describe a process for original manufacturing the component 20; e.g., creating a brand new component. The term "manufacturing" may also or alternatively describe a process for remanufacturing or otherwise repairing the component 20; e.g., restoring one or more features of a previously formed component to brand new condition, similar to brand new condition, better than brand new condition, etc. The component 20, for example, may be repaired to fix one or more defects (e.g., delamination, cracks, wear and/or other damage) imparted during previous use of the component 20. The component 20 may also or alternatively be repaired to fix one or more defects imparted during the initial formation of the component 20.

Figure 2:
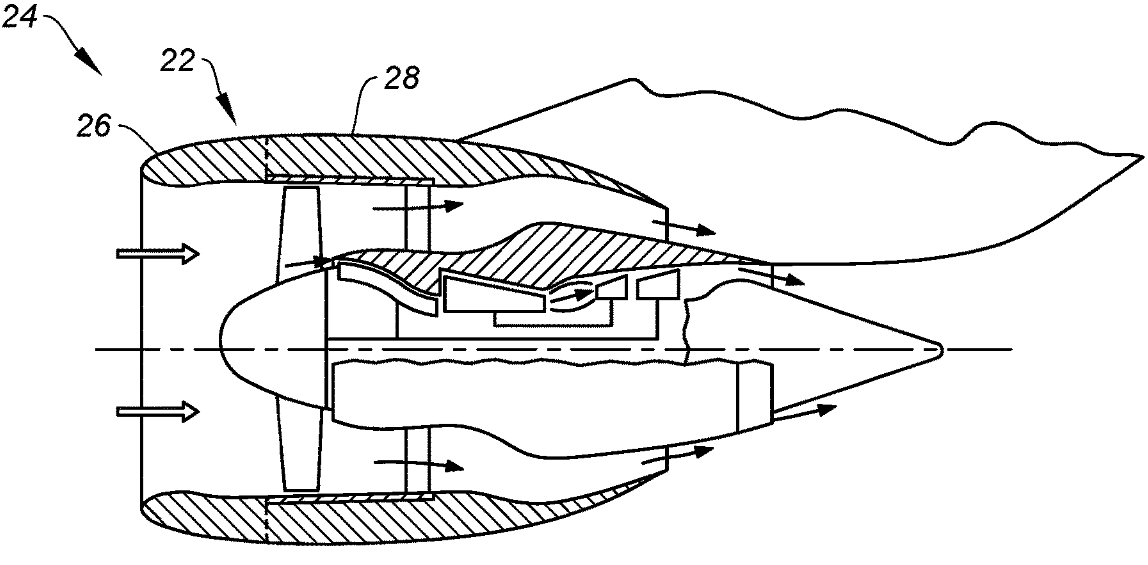
FIG. 2 is a cutaway schematic sectional illustration of an aircraft propulsion system which may include the thermoplastic composite component.
Figure 3:
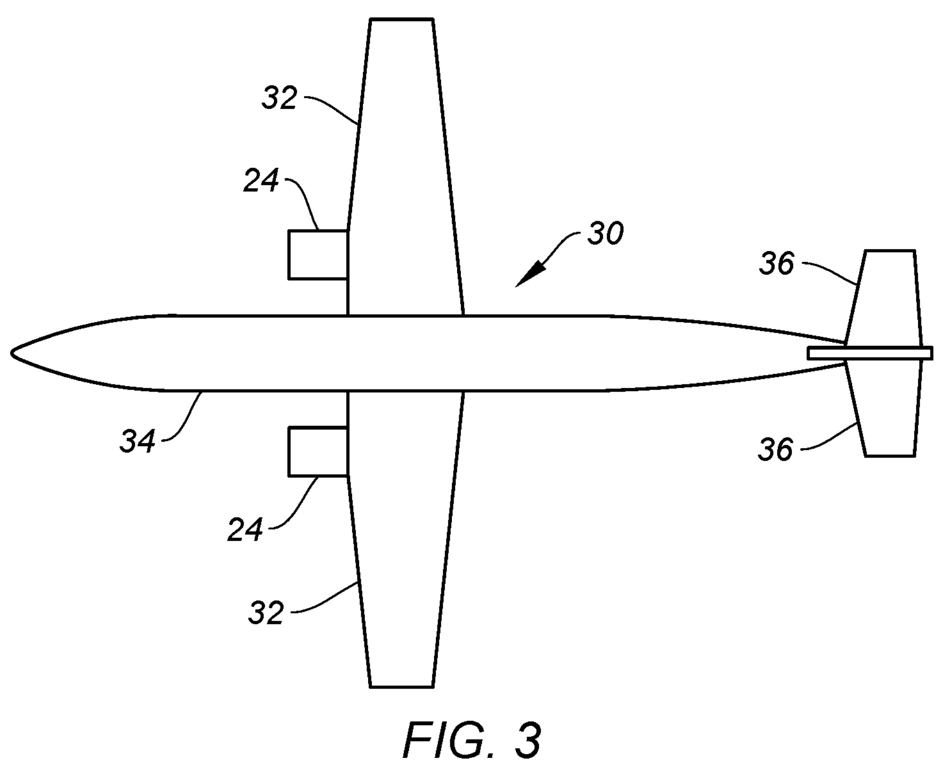
FIG. 3 is a schematic illustration of an aircraft with an aircraft airframe which may include the thermoplastic composite component.

The component 20 may be any component of an aircraft which is constructed from or otherwise includes thermoplastic composite material. Referring to FIG. 2, the aircraft component may be configured as or otherwise included as part of a nacelle 22 for a propulsion system 24 of the aircraft. The aircraft component, for example, may be (or may be part of) a component of a nacelle inlet structure 26; e.g., a nacelle inlet lip (e.g., a nose lip), a nacelle outer barrel, a nacelle inner barrel, etc. In another example, the aircraft component may be (or may be part of) another component of the propulsion system nacelle 22 such as a cowl 28 (e.g., a fan cowl), or the like. Referring to FIG. 3, the aircraft component may alternatively be configured as or otherwise included as part of an airframe 30 of the aircraft. The aircraft component, for example, may be (or may be part of) an aircraft wing 32, an aircraft fuselage skin 34, an aircraft stabilizer 36, or the like. The aircraft component may still alternatively be configured as or otherwise included as part of a structure within the aircraft airframe 30; e.g., within a cabin of the aircraft. The present disclosure, however, is not limited to manufacturing the foregoing exemplary aircraft components. Moreover, it is contemplated the manufacturing methods of the present disclosure may be utilized for non-aircraft components.

Figure 4:
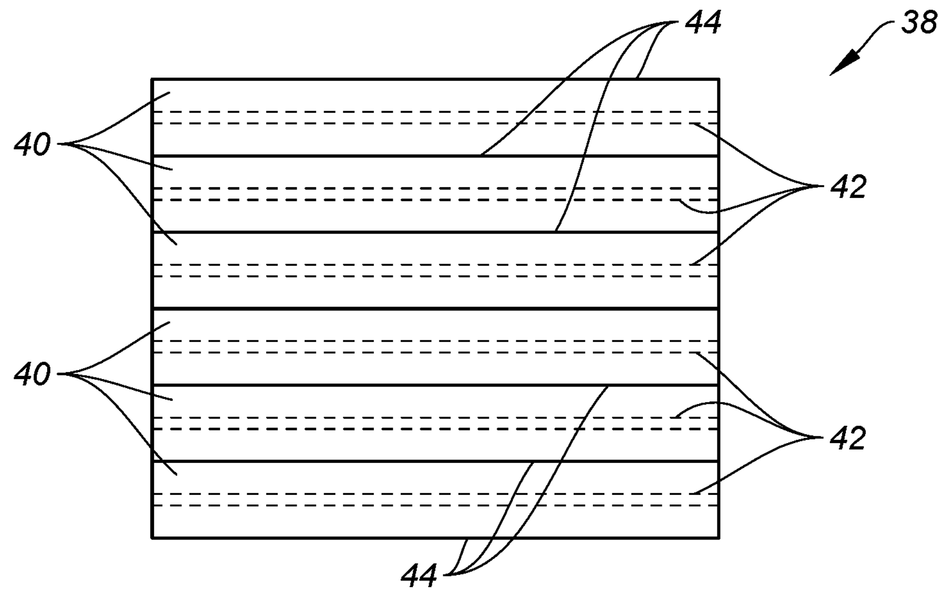
FIG. 4 is a partial schematic sectional illustration of layers of the thermoplastic composite component.

The component 20 of FIG. 1 includes at least (or only) a first thermoplastic composite body 38A ("first body") and a second thermoplastic composite body 38B ("second body") welded to the first body 38A; e.g., at one or more weld locations 39. Referring to FIG. 4, each of these thermoplastic composite bodies 38A and 38B (generally referred to as "38") includes a thermoplastic matrix 40 and fiber-reinforcement 42 embedded within the thermoplastic matrix 40.

Examples of the thermoplastic matrix 40 include, but are not limited to, a semi-crystalline thermoplastic resin and an amorphous thermoplastic resin. Examples of the semi-crystalline thermoplastic resin include polyester, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terephthalate (PTT), polyethylene naphthalate (PEN), and liquid crystal polyester. An example of the polyarylene sulfide is polyphenylene sulfide (PPS). An example of the fluororesin is polytetrafluoroethylene. Examples of the amorphous thermoplastic resin include polycarbonate (PC), polymethyl methacrylate (PMMA), polyphenylene ether (PPE), polyimide (PI), polyamide imide (PAI), polyetherimide (PEI), polysulfone (PSU), polyether sulfone (PES), and polyarylate (PAR). The present disclosure, however, is not limited to the foregoing exemplary thermoplastic matrix materials.

The fiber-reinforcement 42 may be arranged in one or more layers 44 within the respective thermoplastic composite body 38 and its thermoplastic matrix 40. Each layer 44 of the fiber-reinforcement 42 may include a plurality of fiber-reinforcement fibers such as metal fibers, carbon fibers, insulating fibers, organic fibers, and inorganic fibers. Examples of the metal fibers include aluminum fibers, brass fibers, and stainless steel fibers. Examples of the carbon fibers include graphite fibers such as polyacrylonitrile (PAN)-based carbon fibers, rayon-based carbon fibers, lignin-based carbon fibers, and pitch-based carbon fibers. An example of the insulating fibers is glass fibers; e.g., fiberglass fibers. Examples of the organic fibers include aramid fibers, polyparaphenylene benzoxazole (PBO) fibers, polyphenylene sulfide fibers, polyester fibers, acrylic fibers, nylon fibers, and polyethylene fibers. Examples of the inorganic fibers include silicon carbide fibers and silicon nitride fibers. The present disclosure, however, is not limited to the foregoing exemplary fiber-reinforcement materials.

The fiber-reinforcement 42 in each layer 44 of the respective thermoplastic composite body 38 may entirely be a common (the same) fiber-reinforcement material. Alternatively, the fiber-reinforcement 42 in one or more or all of the layers 44 may include multiple different fiber-reinforcement materials within the same layer 44. Different layers 44 within the respective thermoplastic composite body 38 may also or alternatively be configured with different fiber-reinforcement materials between those layers 44; e.g., one layer 44 may include a first material or combination of materials and another layer 44 may include a second material or combination of materials. Some or all of the fibers within a respective layer 44 may be continuous fibers. Some or all of the fibers within a respective layer 44 may also or alternatively be chopped fibers. Some or all of the fibers within a respective layer 44 may be unidirectional. Some or all of the fibers within a respective layer 44 may alternatively be multi-directional; e.g., in a woven sheet, a mat of chopped fibers, etc. The present disclosure, however, is not limited to the foregoing exemplary fiber types and/or fiber arrangements. Moreover, while each thermoplastic composite body 38 is described above as including the fiber-reinforcement 42, it is contemplated one or more of these thermoplastic composite bodies 38 may alternatively be configured without any the fiber-reinforcement 42 embedded within the thermoplastic matrix 40.

Figure 5:
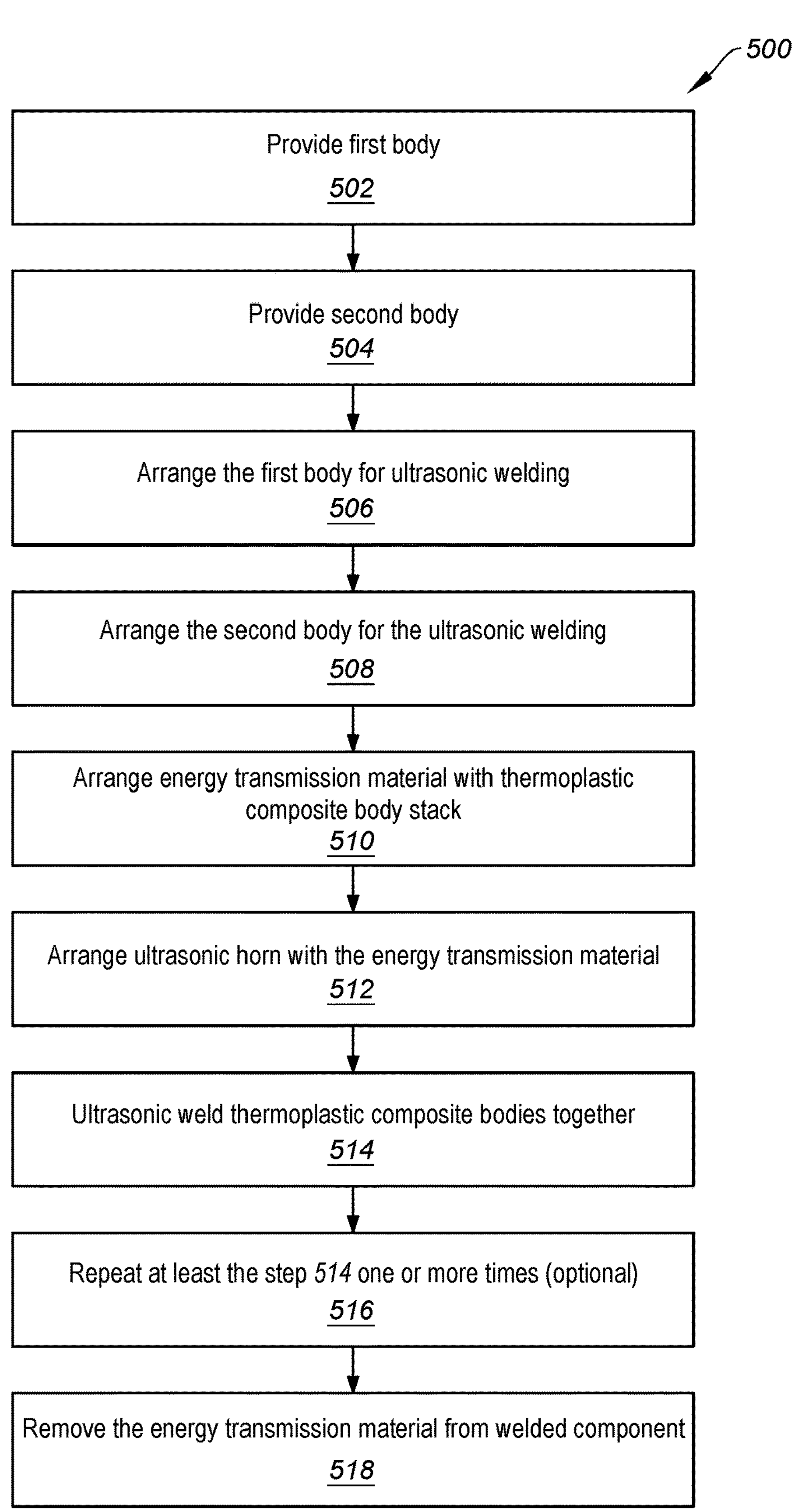
FIG. 5 is a flow diagram of a method for manufacturing a thermoplastic composite component.

FIG. 5 is a flow diagram of a method 500 for manufacturing a component; e.g., a thermoplastic composite component. This manufacturing may be an original manufacturing of the component or a repair (e.g., remanufacturing) of the component. For ease of description, the manufacturing method 500 is described below with reference to the component 20 of FIG. 1; e.g., the aircraft component. The present disclosure, however, is not limited to manufacturing such an exemplary component.

In step 502, the first body 38A is provided. This first body 38A, for example, may be formed using one or more known thermoplastic formation techniques. Examples of such formation techniques include, but are not limited to, laminating, molding, pressing, injection molding, overmolding, and stamping between a plurality of dies. In another example, the first body 38A may be cut out from stock material; e.g., a sheet of thermoplastic composite material, prepreg material, etc. This material may then be shaped (if needed) to provide the first body 38A. In still another example, the first body 38A may be a damaged component 46 to be repaired using the manufacturing method 500.

In step 504, the second body 38B is provided. This second body 38B, for example, may be formed using one or more known thermoplastic formation techniques. Examples of such formation techniques include, but are not limited to, laminating, molding, pressing, injection molding, overmolding, and stamping between a plurality of dies. In another example, the second body 38B may be cut out from stock material; e.g., a sheet of thermoplastic composite material, prepreg material, etc. This material may then be shaped (if needed) to provide the second body 38B. Where the first body 38A is the damaged component 46 to be repaired using the manufacturing method 500, the second body 38B may be configured as (or part of) a patch to repair the first body 38A.

Figure 6:
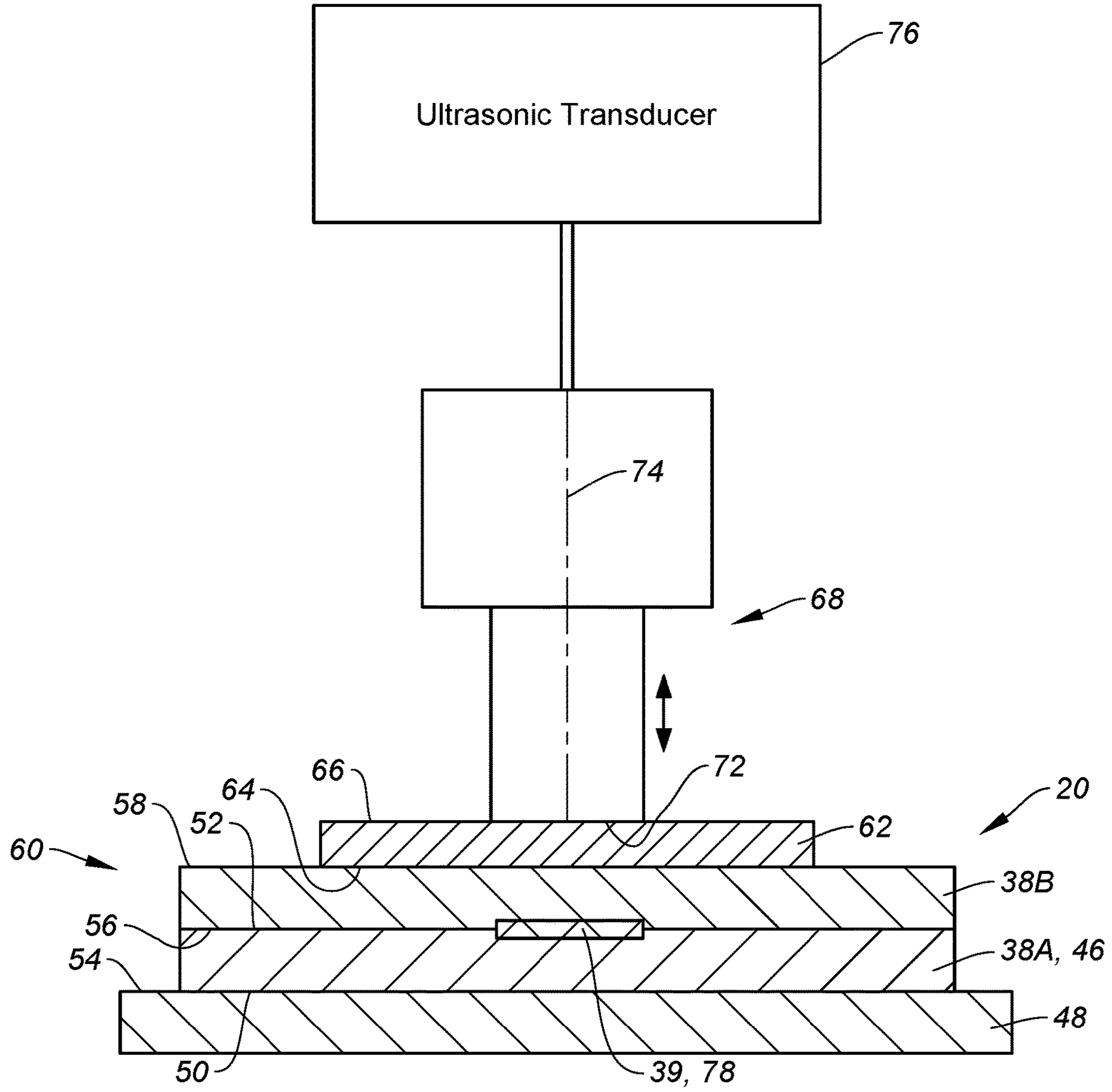
FIG. 6 is a partial schematic sectional illustration of a system for ultrasonic welding an arrangement of thermoplastic components together.

In step 506, the first body 38A is arranged for ultrasonic welding. For example, referring to FIG. 6, the first body 38A may be disposed on a rigid support structure 48; e.g., a metal anvil or die. The first body 38A of FIG. 6 has a thickness that extends vertically between and to a first (e.g., lower) surface 50 of the first body 38A and a second (e.g., upper) surface 52 of the first body 38A. The first body first surface 50 of FIG. 6 is abutted against and contacts a (e.g., upper) support surface 54 of the rigid support structure 48. The first body first surface 50, for example, may lay against (e.g., rest on, be disposed in full contact with, be disposed flat against, etc.) the support structure support surface 54. While the surfaces 50 and 54 are shown with straight-line sectional geometries in the plane of FIG. 6, it is contemplated the surfaces 50 and 54 may alternatively have non-straight-line (e.g., curved, compound, etc.) sectional geometries in the plane of FIG. 6. Moreover, the surfaces 50 and 54 may also or alternatively have straight-line or non-straight-line sectional geometries in a plane perpendicular to the plane of FIG. 6. For example, the surfaces 50 and 54 may be flat, planar surfaces, two-dimensional (2D) curved or otherwise non-flat surfaces, or three-dimensional (3D) curved or otherwise non-flat surfaces. Referring again to FIG. 6, the first body 38A may be (e.g., temporarily) secured to the rigid support structure 48, or the first body 38A may simply rest against the rigid support structure 48.

In step 508, the second body 38B is arranged with the first body 38A for the ultrasonic welding. For example, the second body 38B of FIG. 6 is disposed on the first body 38A. The second body 38B of FIG. 6 has a thickness that extends vertically between and to a first (e.g., lower) surface 56 of the second body 38B and a second (e.g., upper) surface 58 of the second body 38B. The second body first surface 56 of FIG. 6 is abutted against and contacts the first body second surface 52. The second body first surface 56, for example, may lay against (e.g., rest on, be disposed in full contact with, be disposed flat against, etc.) the first body second surface 52. While the surfaces 52 and 56 are shown with straight-line sectional geometries in the plane of FIG. 6, it is contemplated the surfaces 52 and 56 may alternatively have non-straight-line (e.g., curved, compound, etc.) sectional geometries in the plane of FIG. 6. Moreover, the surfaces 52 and 56 may also or alternatively have straight-line or non-straight-line sectional geometries in a plane perpendicular to the plane of FIG. 6. For example, the surfaces 52 and 56 may be flat, planar surfaces, two-dimensional (2D) curved or otherwise non-flat surfaces, or three-dimensional (3D) curved or otherwise non-flat surfaces. Referring again to FIG. 6, the first body 38A is disposed vertically between (e.g., may completely separate) and contacts the rigid support structure 48 and the second body 38B. Here, the (still discrete, non-welded) thermoplastic composite bodies 38 are arranged in a stack 60 on/over the rigid support structure 48. The second body 38B may be (e.g., temporarily) secured to the rigid support structure 48 and/or the first body 38A, or the second body 38B may simply rest against the first body 38A.

In step 510, energy transmission material 62 (e.g., an ultrasonic welding coupling stack) is arranged with the thermoplastic composite body stack 60. For example, the energy transmission material 62 of FIG. 6 is disposed on at least (or only) the second body 38B. The energy transmission material 62 of FIG. 6 has a thickness that extends vertically between and to a first (e.g., lower) surface 64 of the energy transmission material 62 and a second (e.g., upper) surface 66 of the energy transmission material 62. The support material first surface 64 of FIG. 6 is abutted against and contacts the second body second surface 58. The support material first surface 64, for example, may lay against (e.g., rest on, be disposed in full contact with, be disposed flat against, etc.) the second body second surface 58. While the surfaces 58 and 64 are shown with straight-line sectional geometries in the plane of FIG. 6, it is contemplated the surfaces may alternatively have non-straight-line (e.g., curved, compound, etc.) sectional geometries in the plane of FIG. 6. Moreover, the surfaces 58 and 64 may also or alternatively have straight-line or non-straight-line sectional geometries in a plane perpendicular to the plane of FIG. 6. For example, the surfaces 58 and 64 may be flat, planar surfaces, two-dimensional (2D) curved or otherwise non-flat surfaces, or three-dimensional (3D) curved or otherwise non-flat surfaces. Referring again to FIG. 6, the composite body stack 60 and its elements 38A and 38B are disposed vertically between the rigid support structure 48 and the energy transmission material 62. The second body 38B of FIG. 6 is disposed vertically between (e.g., may completely separate) and contacts the first body 38A and the energy transmission material 62. The energy transmission material 62 may be (e.g., temporarily) secured to the rigid support structure 48 and/or the composite body stack 60 and its second body 38B, or the energy transmission material 62 may simply rest against the composite body stack 60 and its second body 38B.

Figure 7:
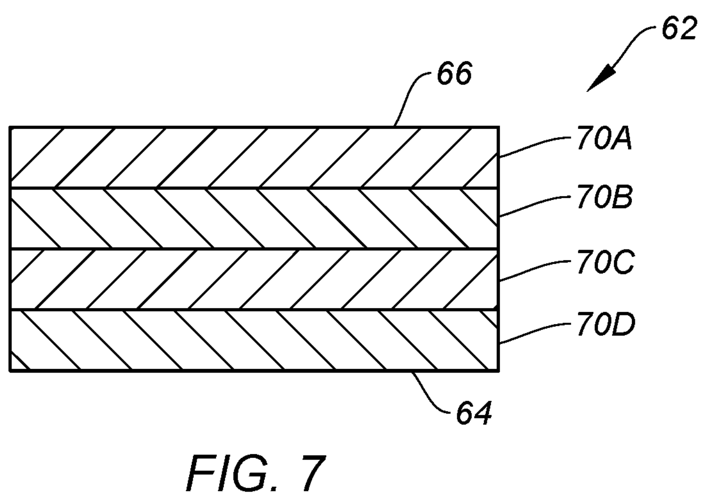
FIG. 7 is a partial schematic sectional illustration of layers of energy transmission material.

The energy transmission material 62 is configured to provide a physical buffer between the composite body stack 60 and an ultrasonic horn 68 (e.g., a sonotrode) used for the ultrasonic welding. The energy transmission material 62 may enable the normal vibration of the ultrasonic horn 68 to be absorbed by the weld pieces (e.g., 38A and 38B) as a normal vibration that will create friction between the weld plate to create the initial heating to start the welding process and weld the thermoplastic composite bodies 38 together. Without the support material, the normal vibration may be transformed into transverse and/or bending waves that transport the energy away from the intended weld zone and can cause hot spots in the weld pieces (e.g., 38A and 38B) away from the intended weld area or even at the weld piece edges. This energy transmission material 62 may be a flexible (e.g., non-rigid, compliant, pliable, etc.) body. Referring to FIG. 7, the energy transmission material 62 and its body may include one or more layers 70A-D (generally referred to as "70"). Each of these layers 70 may be a flexible layer of material. The energy transmission material 62 and its body, for example, may include one or more layers of flexible elastomer or plastic material. Examples of the elastomer material include polytetrafluoroethylene (e.g., Teflon®), fluoroelastomer, silicone rubber, chlorosulphonated polyethene rubber, ethylene-propylene-diene monomer, hydrogenated acrylonitrile-butadiene rubber and polyurethane, where fiber reinforcement may or may not be disposed within a matrix of the elastomer material. The energy transmission material 62 and its body may also or alternatively include one or more layers of flexible elastomeric material. It is contemplated, however, one or more of the layers 70 may alternatively be formed from a more rigid material such as metal. Examples of the metal include stainless steel, titanium (Ti), copper (Cu) and bronze. The energy transmission material 62 and its body, for example, may also include one or more layers of metal; e.g., sheet metal layers, metal plates, etc. The present disclosure, however, is not limited to the foregoing exemplary energy transmission material compositions nor layer arrangements.

In step 512, the ultrasonic horn 68 is arranged with the energy transmission material 62 for the ultrasonic welding. A tip 72 of the ultrasonic horn 68 of FIG. 6, for example, is positioned over the energy transmission material 62 and its support material second surface 66. The ultrasonic horn 68 and its tip 72 also engage (e.g., contact) the energy transmission material 62 and its support material second surface 66. In particular, the ultrasonic horn 68 of FIG. 6 extends vertically along a vertical axis 74 (e.g., a centerline of the ultrasonic horn 68) in a direction towards the elements 38, 48, 62 to the horn tip 72. The ultrasonic horn 68 of FIG. 6 is coupled to an ultrasonic transducer 76.

In step 514, the thermoplastic composite bodies 38 are ultrasonic welded together using the ultrasonic horn 68. The ultrasonic transducer 76, for example, is configured to move (e.g., translate, oscillate, etc.) the ultrasonic horn 68 back-and-forth (e.g., vertically up-and-down) along the vertical axis 74 during the ultrasonic welding. Oscillating forces (e.g., pressing and releasing) from this movement of the ultrasonic horn 68 are transferred through the energy transmission material 62 into the thermoplastic composite body stack 60 and heat the thermoplastic matrix 40 (see FIG. 4) of the first body 38A and the second body 38B. The heating softens and then locally melts the thermoplastic matrix 40 and thereby welds the second body 38B to the first body 38A at and about a point 78 laterally aligned with the ultrasonic horn 68; e.g., the weld location 39. Meanwhile, the energy transmission material 62 provides a buffer between the ultrasonic horn 68 and the thermoplastic composite bodies 38 being welded together. Providing this buffer may reduce or prevent deformation and/or marring of the second body 38B and its second body second surface 58 by the ultrasonic horn 68. In addition to the foregoing, by locating the energy transmission material 62 above the thermoplastic composite body stack 60 (e.g., between the second body 38B and the ultrasonic horn 68), the energy transmission material 62 may be readily and easily moved during the manufacturing method 500. For example, the energy transmission material 62 may be moved to ensure proper placement relative to the ultrasonic horn 68. The energy transmission material 62 may also be moved to facilitate further welding as discussed below.

In step 516, at least (or only) the welding step 514 may be repeated one or more times at different lateral locations along the thermoplastic composite body stack 60 to weld the second body 38B to the first body 38A at one or more additional locations. The second body 38B may thereby be spot welded to the first body 38A to form the component 20. In other embodiments, however, the second body 38B may also or alternatively be continuous welded and/or discontinuous welded to the first body 38A to form the component 20 at one or more weld joints. During the continuous welding, the weld pieces (e.g., 38A and 38B) under the ultrasonic horn 68 are at different stages of the welding process. At a leading edge of the ultrasonic horn 68, the process is in the initial phase of heating (friction based) while at the trailing edge of the ultrasonic horn 68 the process is in the final stage in which heat is generated by internal viscoelastic heating.

In step 518, following the welding (e.g., steps 514, 516) the energy transmission material 62 is removed from the second body 38B. For example, while the energy transmission material 62 provides a buffer between the second body 38B and the ultrasonic horn 68 during the ultrasonic welding (e.g., steps 514, 516), the energy transmission material 62 may remain detached (e.g., unwelded) from the second body 38B during and following the ultrasonic welding. In particular, the energy transmission material 62 is not welded to the second body 38B during or following the ultrasonic welding of the second body 38B to the first body 38A (e.g., steps 514, 516). The energy transmission material 62 may thereby further function as a release sheet against the second body 38B. The energy transmission material 62 may be lifted off the component 20 and its second body 38B, for example, without requiring an additional process; e.g., milling, machining, scraping, etc. Moreover, the energy transmission material 62 may be readily moved to facilitate the additional ultrasonic welding step 516 as needed.

Figure 8:
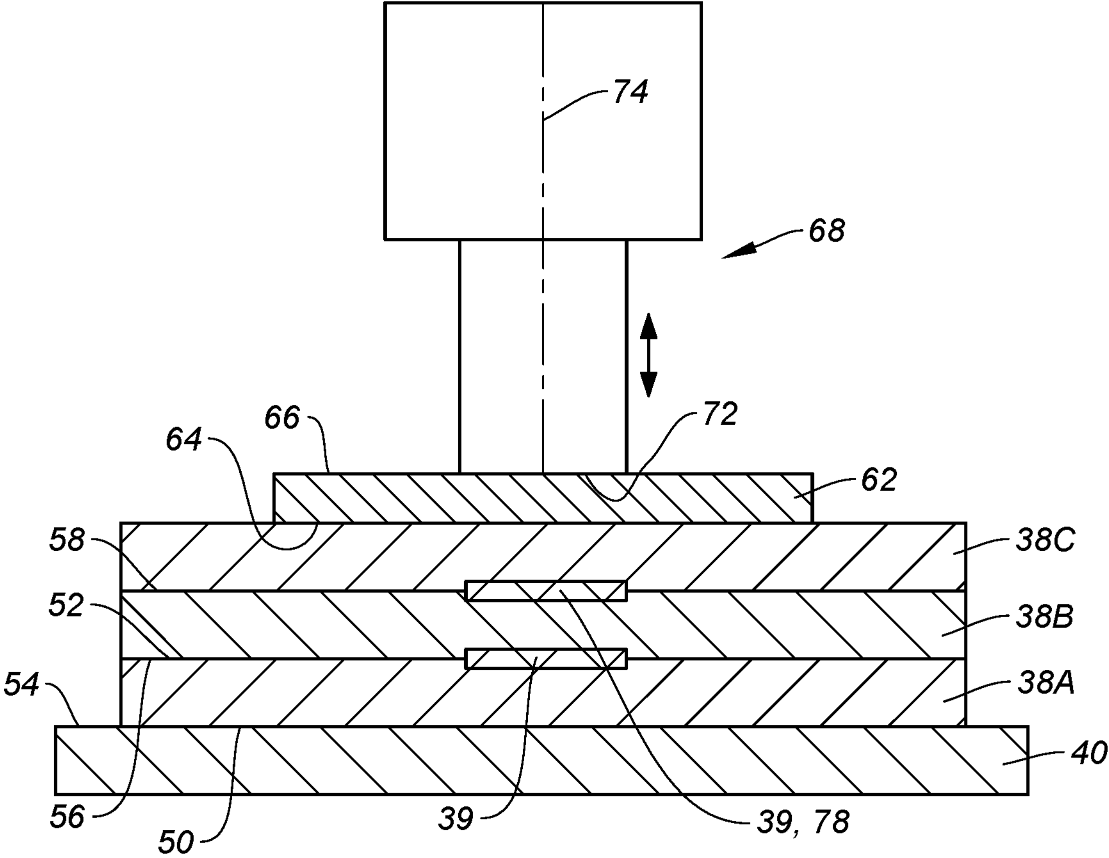
FIG. 8 is a partial schematic sectional illustration of the system for ultrasonic welding another arrangement of thermoplastic components together.

While the component 20 of FIG. 6 includes the two welded thermoplastic composite bodies 38, it is contemplated the component 20 may alternatively include one or more additional thermoplastic composite bodies. For example, referring to FIG. 8, a third thermoplastic composite body 38C ("third body") may be ultrasonic welded to the second body 38B, for example, following the ultrasonic welding of the second body 38B to the first body 38A. The welding of the third body 38C may be performed using the steps described above where the energy transmission material 62 (or different energy transmission material) is arranged between the third body 38C and the ultrasonic horn 68.

Figure 9:
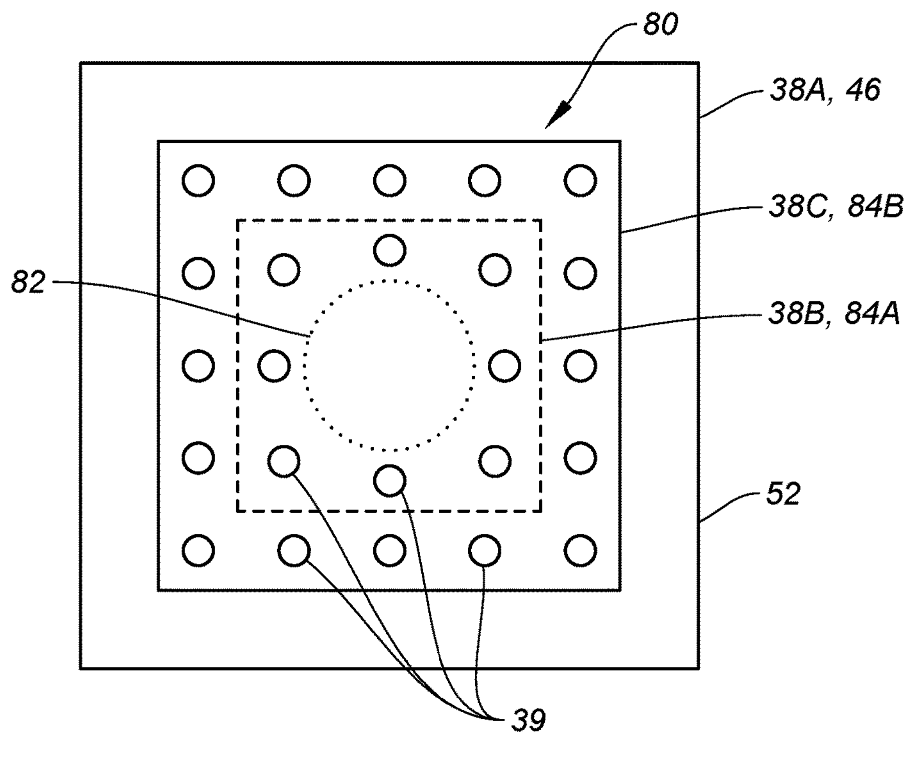
FIG. 9 is a partial schematic illustration of a repaired thermoplastic composite component.
Figure 10:
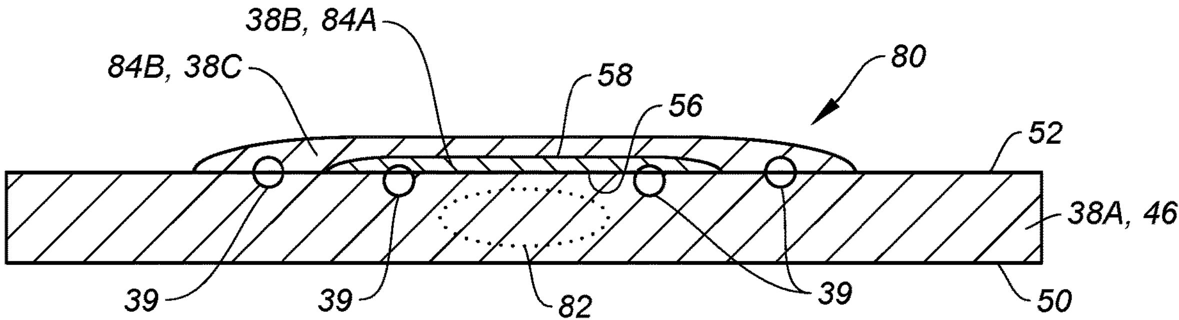
FIG. 10 is a partial schematic sectional illustration of the repaired thermoplastic composite component of FIG. 9.

Referring to FIGS. 9 and 10, where the first body 38A is the damaged component 46 being repaired, each body (e.g., 38B, 38C) ultrasonic welded (directly or indirectly) to the first body 38A is configured as (or part of) a patch 80 for the first body 38A. The patch 80 of FIG. 10 may be arranged to cover a damaged portion 82 of the first body 38A. A first layer 84A (e.g., the second body 38B) of the patch 80 of FIG. 10, for example, contacts the first body second surface 52 (e.g., an exterior surface of the first body 38A) and extends over the damaged portion 82 of the first body 38A. This first patch layer 84A is ultrasonic welded to the first body 38A. A second layer 84B (e.g., the third body 38C) of the patch 80 of FIG. 10 contacts the first patch layer 84A and may also contact the first body second surface 52. This second patch layer 84B is ultrasonic welded to the first patch layer 84A and may also be ultrasonic welded to the first body 38A.

Figure 11:
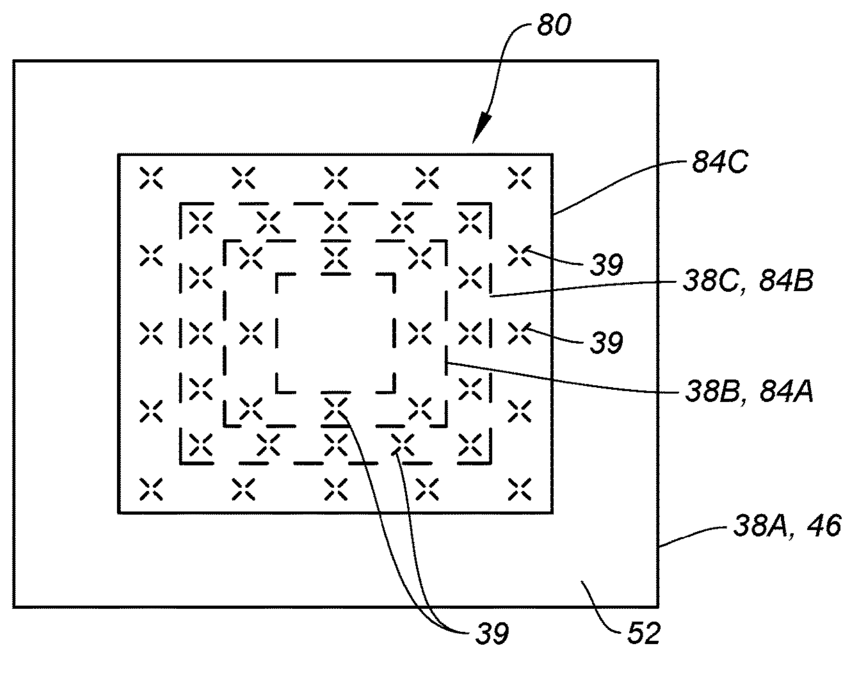
FIG. 11 is a partial schematic illustration of another repaired thermoplastic composite component.
Figure 12:
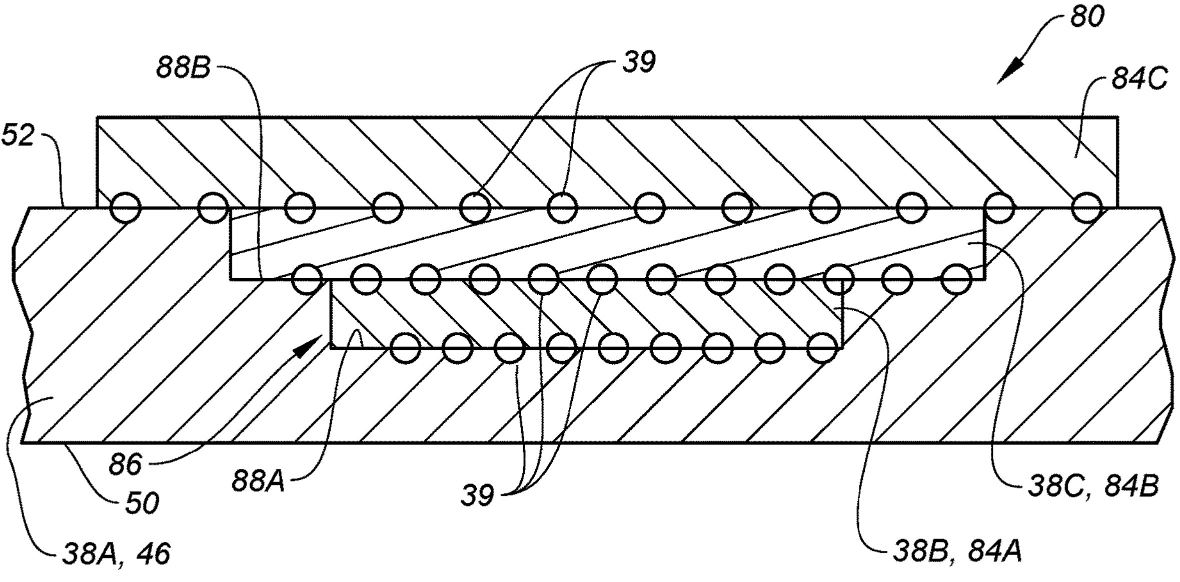
FIG. 12 is a partial schematic sectional illustration of the repaired thermoplastic composite component of FIG. 11.

Referring to FIGS. 11 and 12, the patch 80 may alternatively be arranged to at least partially or completely replace the damaged portion of the first body 38A. For example, some or all of the damaged portion of the first body 38A may be removed from the first body 38A via one or more removal techniques; e.g., machining, milling, cutting, blasting, etc. Referring to FIG. 12, this removal may form an aperture 86 in the first body 38A. The aperture 86 of FIG. 12 projects (e.g., partially) vertically into the first body 38A from its first body second surface 52 (e.g., an exterior surface of the first body 38A) to one or more interior surfaces 88A and 88B of the first body 38A. Following this removal, layers 84A-C (generally referred to as "84") of the patch 80 (e.g., each body 38B, 38C) may be individually disposed within/over the aperture 86 and welded to the first body 38A. The first patch layer 84A of FIG. 12 contacts the innermost interior surface 88A. The first patch layer 84A is ultrasonic welded to the first body 38A. The second patch layer 84B of FIG. 12 contacts the first patch layer 84A and may also contact the next outward interior surface 88B. The second patch layer 84B is ultrasonic welded to the first patch layer 84A and may also be ultrasonic welded to the first body 38A. The third patch layer 84C of FIG. 12 is disposed outside of the aperture 86. The third patch layer 84C contacts the second patch layer 84B and may also contact the first body second surface 52. The third patch layer 84C is ultrasonic welded to the second patch layer 84B and may also be ultrasonic welded to the first body 38A.

In some embodiments, referring to FIGS. 10 and 12, the first body second surface 52 (along with the exposed patch layer) may at least partially or completely form an exterior surface of the repaired component. This exterior surface may also be an aerodynamic flow surface of the repaired component. In other embodiments, referring to FIG. 6, the first body first surface 50 may at least partially or completely form an exterior surface of the component 20. This exterior surface may also be an aerodynamic flow surface of the component 20. Note, by arranging the aerodynamic flow surface against the rigid support structure 48, a shape and contour of the aerodynamic flow surface may be preserved during the ultrasonic welding.

Figure 13:
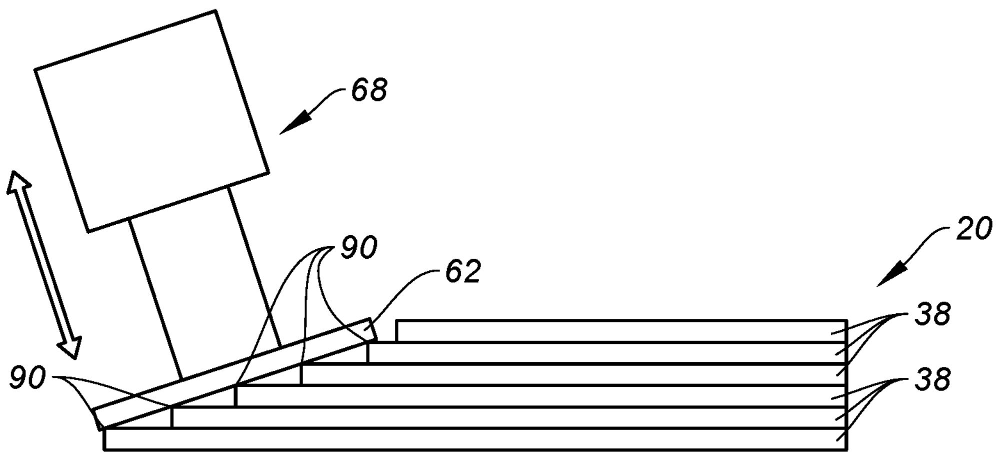
FIG. 13 is a partial schematic sectional illustration of the system for ultrasonic welding another arrangement of thermoplastic components together.

In some embodiments, referring to FIG. 13, the energy transmission material 62 may contact more than one of the thermoplastic composite bodies 38 simultaneously. The energy transmission material 62 of FIG. 13, for example, is arranged over and along edges 90 of multiple bodies 38; e.g., patch layers. This may facilitate an increase in weld area. Moreover, the flexible nature of the energy transmission material 62 may reduce or prevent deformation to the edges 90. The energy transmission material 62, for example, may partially or completely conform to contours of the edges 90.

As described above, the energy transmission material 62 is disposed between the ultrasonic horn 68 and the composite bodies 38 being ultrasonic welded using the ultrasonic horn 68. The energy transmission material 62 may therefore be placed on top of the composite bodies 38 being ultrasonic welded. With such an arrangement, the energy transmission material 62 may be easily moved and/or otherwise adjusted in preparation for and/or during the ultrasonic welding. The energy transmission material 62 may also be readily removed following the ultrasonic welding. By contrast, if the energy transmission material 62 was disposed below the composite body/bodies 38 being ultrasonic welded such that the composite bodies 38 are between the ultrasonic horn 68 and the energy transmission material 62, movement, adjustment and/or removal of the energy transmission material 62 may be significantly more difficult. In addition to the foregoing, by utilizing the energy transmission material 62 between the ultrasonic horn 68 and the composite bodies 38 being ultrasonic welded, use of an energy director (e.g., a thermoplastic film) between the composite bodies 38 may be omitted. For example, the composite bodies 38A and 38B of FIG. 6 may directly contact one another without any intermediate material (e.g., the energy director) therebetween. This may further simplify the ultrasonic welding process.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method, comprising:

arranging a first thermoplastic composite body on a rigid support structure, the first thermoplastic composite body contacting the rigid support structure;

arranging a second thermoplastic composite body on the first thermoplastic composite body, the second thermoplastic composite body contacting the first thermoplastic composite body;

arranging energy transmission material on the second thermoplastic composite body, wherein the first thermoplastic composite body and the second thermoplastic composite body are disposed between the rigid support structure and the energy transmission material;

ultrasonic welding the second thermoplastic composite body to the first thermoplastic composite body using an ultrasonic horn, wherein the energy transmission material is arranged between the second thermoplastic composite body and the ultrasonic horn; and providing an aircraft component, wherein the aircraft component includes the first thermoplastic composite body and the second thermoplastic composite body welded to the first thermoplastic composite body.

2. The method of claim 1, wherein the energy transmission material comprises one or more flexible layers of material.

3. The method of claim 1, wherein the energy transmission material comprises one or more layers of elastomeric material.

4. The method of claim 3, wherein the elastomeric material comprises at least one of polytetrafluoroethylene, fluoroelastomer, silicone rubber, chlorosulphonated polyethene rubber, ethylene-propylene-diene monomer, hydrogenated acrylonitrile-butadiene rubber or polyurethane.

5. The method of claim 1, wherein the energy transmission material comprises one or more layers of metal.

6. The method of claim 1, further comprising lifting the energy transmission material off of the second thermoplastic composite body following the ultrasonic welding.

7. The method of claim 1, wherein the energy transmission material is not welded to the second thermoplastic composite body during the ultrasonic welding.

8. The method of claim 1, wherein the energy transmission material contacts the second thermoplastic composite body.

9. The method of claim 8, wherein the energy transmission material further contacts the first thermoplastic composite body.

10. The method of claim 1, wherein the second thermoplastic composite body contacts an exterior surface of the first thermoplastic composite body.

11. The method of claim 1, wherein an aperture extends into the first thermoplastic composite body from an exterior surface of the first thermoplastic composite body to an interior surface of the first thermoplastic composite body; and the second thermoplastic composite body contacts the interior surface.

12. The method of claim 11, further comprising:

removing the energy transmission material from the second thermoplastic composite body following the ultrasonic welding of the second thermoplastic composite body to the first thermoplastic composite body;

arranging a third thermoplastic composite body on the second thermoplastic composite body and within the aperture;

arranging the energy transmission material or additional energy transmission material on the third thermoplastic composite body; and ultrasonic welding the third thermoplastic composite body to the second thermoplastic composite body using the ultrasonic horn.

13. The method of claim 11, further comprising removing a damaged portion of the first thermoplastic composite body to form the aperture in the first thermoplastic composite body.

14. The method of claim 1, wherein the ultrasonic horn extends along a vertical axis to a tip engaged with the energy transmission material; and the ultrasonic horn moves vertically up and down along the vertical axis during the ultrasonic welding.

15. The method of claim 1, wherein a surface of the first thermoplastic composite body which contacts the rigid support structure during the ultrasonic welding at least partially forms an exterior aerodynamic flow surface of the aircraft component.

16. The method of claim 1, wherein at least one of the first thermoplastic composite body or the second thermoplastic composite body comprises a semi-crystalline thermoplastic resin or an amorphous thermoplastic resin.

17. A repair method, comprising:

providing an aircraft component comprising a first thermoplastic composite body;

arranging a second thermoplastic composite body on the first thermoplastic composite body;

arranging energy transmission material on the second thermoplastic composite body, wherein the second thermoplastic composite body is disposed between and contacts the first thermoplastic composite body and the energy transmission material; and ultrasonic welding the second thermoplastic composite body to the first thermoplastic composite body using an ultrasonic horn to at least partially repair a damaged portion of the first thermoplastic composite body, wherein the energy transmission material is arranged between the second thermoplastic composite body and the ultrasonic horn.

18. The repair method of claim 17, further comprising:

removing the damaged portion from the first thermoplastic composite body to form an aperture in the first thermoplastic composite body;

the arranging of the second thermoplastic composite body comprising disposing the second thermoplastic composite body within the aperture and onto an interior surface of the first thermoplastic composite body.

* * * * *